US009734520B2

(12) United States Patent
Scipioni

(10) Patent No.: US 9,734,520 B2
(45) Date of Patent: Aug. 15, 2017

(54) PROMPT, DETAILED RATING OF GOODS AND SERVICES WITH DELAYED FEEDBACK

(71) Applicant: PAYPAL, INC., San Jose, CA (US)

(72) Inventor: German Scipioni, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 611 days.

(21) Appl. No.: 14/048,886

(22) Filed: Oct. 8, 2013

(65) Prior Publication Data

US 2015/0100457 A1 Apr. 9, 2015

(51) Int. Cl.
G06Q 20/00 (2012.01)
G06Q 40/00 (2012.01)
G06Q 30/02 (2012.01)
G06Q 30/06 (2012.01)

(52) U.S. Cl.
CPC ..... *G06Q 30/0282* (2013.01); *G06Q 30/0633* (2013.01)

(58) Field of Classification Search
CPC .............................. G06Q 30/02; G06F 15/173
USPC .......................... 705/16, 26.8, 7.32; 709/223
See application file for complete search history.

(56) References Cited

U.S. PATENT DOCUMENTS

| 8,100,322 B1* | 1/2012 | Nachenburg | G06Q 30/02 235/376 |
| 8,332,294 B1* | 12/2012 | Thearling | G06Q 30/02 705/347 |
| 2008/0228584 A1* | 9/2008 | Huard | G06Q 30/02 705/14.1 |
| 2009/0024709 A1* | 1/2009 | Moody | G06Q 10/107 709/206 |
| 2009/0259547 A1* | 10/2009 | Clopp | G06Q 30/0214 705/14.16 |
| 2010/0038416 A1* | 2/2010 | Canora | G06Q 30/02 235/375 |
| 2010/0043055 A1* | 2/2010 | Baumgart | G06Q 20/12 726/2 |
| 2010/0122212 A1* | 5/2010 | Boudalier | G06F 17/3089 715/811 |
| 2010/0299251 A1* | 11/2010 | Thomas | G06Q 20/10 705/39 |
| 2012/0158589 A1* | 6/2012 | Katzin | G06Q 20/12 705/44 |
| 2012/0209970 A1* | 8/2012 | Scipioni | G06Q 30/06 709/223 |

(Continued)

*Primary Examiner* — Seye Iwarere
(74) *Attorney, Agent, or Firm* — Haynes & Boone, LLP

(57) ABSTRACT

Methods and systems are provided for giving prompt, detailed ratings feedback (e.g., as a purchase is being made or a user is shopping or dining with a merchant) that can be subjected to a controlled delay in sending the actual feedback to merchants. "Merchant" is used in a general sense to include both providers of goods and providers of services, such as dining (e.g., restaurants, coffee shops), car maintenance, carpet cleaning, home remodeling, and plumbing, for example). The feedback may be provided from a consumer mobile device. Embodiments may provide information useable in real time (e.g., as the user is considering the ratings to be given) from the merchant back to the consumer for improving the ratings feedback or that the consumer can use, for example, for making purchasing decisions.

20 Claims, 4 Drawing Sheets

(56) References Cited

U.S. PATENT DOCUMENTS

| | | | |
|---|---|---|---|
| 2013/0046661 A1* | 2/2013 | Levin | G06Q 40/02 705/30 |
| 2013/0173404 A1* | 7/2013 | Scipioni | G06Q 30/0282 705/16 |
| 2013/0325579 A1* | 12/2013 | Salmon | G06Q 30/0228 705/14.29 |
| 2014/0074748 A1* | 3/2014 | Xie | G06Q 30/0282 705/347 |
| 2014/0082055 A1* | 3/2014 | Achan, Jr. | H04L 67/22 709/203 |
| 2015/0058255 A1* | 2/2015 | Cork | G06Q 50/12 705/347 |
| 2015/0100457 A1* | 4/2015 | Scipioni | G06Q 30/0633 705/26.8 |
| 2015/0242494 A1* | 8/2015 | Safaie | G06F 17/30867 707/749 |
| 2015/0310515 A1* | 10/2015 | Zamer | G06Q 30/0605 705/26.2 |
| 2015/0332303 A1* | 11/2015 | Kodali | G06Q 30/0229 705/14.25 |
| 2015/0356579 A1* | 12/2015 | Brondstetter | G06Q 30/0203 705/7.32 |

* cited by examiner

PROMPT, DETAILED RATING OF GOODS AND SERVICES WITH DELAYED FEEDBACK

BACKGROUND

Technical Field

The present disclosure generally relates to electronic commerce and, more particularly, relates to methods and systems for providing prompt and detailed ratings with controlled feedback to merchants (including providers of services) from a consumer mobile device and for providing information useable in real time back to the consumer.

Related Art

Consumer feedback on purchases can be valuable to a merchant for improving merchant services and/or products. Typical feedback is provided by consumers well after the consumer has left a merchant location, resulting in feedback that may not be as useful as it could be. Sometimes feedback is provided months after the purchase.

Merchants, typically restaurants, provide comment cards at the restaurant to enable customers to provide feedback at the location. However, consumers may not want to take the time to fill out a card, and even if a feedback card is completed, it may be hours or even days before the merchant reads the card.

BRIEF DESCRIPTION OF THE DRAWINGS

The included drawings are for illustrative purposes and serve only to provide examples of possible systems and methods for the disclosed methods and system for providing detailed, prompt consumer ratings feedback to merchants and also providing information useable in real time back to the consumer. These drawings in no way limit any changes in form and detail that may be made to that which is disclosed by one skilled in the art without departing from the spirit and scope of this disclosure.

DETAILED DESCRIPTION

Figure 1:
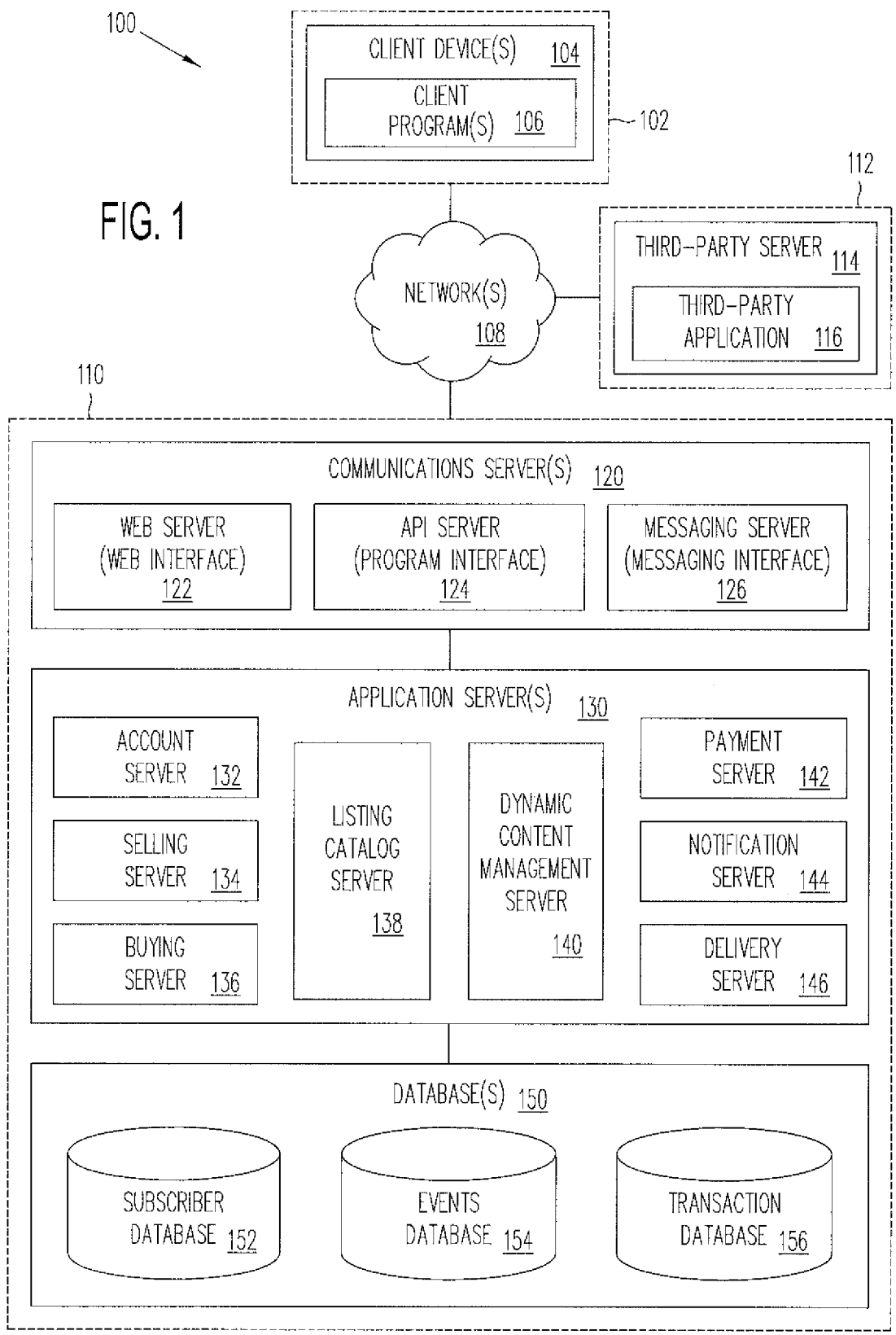
FIG. 1 is a block diagram of a computing system that is adapted for implementing one or more examples of processes involving activities with respect to providing detailed, prompt consumer ratings with controlled feedback to merchants and also providing information useable in real time back to the consumer, according to an embodiment.

According to an embodiment, methods and systems can provide prompt detailed ratings feedback, with or without a controlled delay of sending the actual feedback, to merchants (used in a general sense to include both providers of goods and providers of services, such as dining (e.g., restaurants, coffee shops), car maintenance, carpet cleaning, home remodeling, and plumbing, for example) from a consumer mobile device and can provide information useable in real time from the merchants back to the consumer. The ratings can be given or entered on the mobile device promptly, in the sense that the ratings are entered as the customer or consumer (generally referred to as "user") is in the process of shopping or making purchases from the merchant. In the case of providers of services, ratings may be provided as the user is in the course of receiving the services, for example, while a customer is in the process of dining at a restaurant, ordering at a coffee shop, having a car repaired, or waiting for a contractor to finish home repairs. Using one or more embodiments, the customer user can provide a prompt rating while the service and its quality are fresh in the mind of the customer.

In one embodiment, the user can also receive information that can refresh the user's memory regarding similar experiences that can be included in the rating about the merchant—such as the user's previous purchases from, experiences with, or ratings of the merchant—in real time, e.g., as the service is being received or in time to be considered by the user in giving the prompt rating. Such improved feedback—being prompt, more detailed, more candid, and based on better information available to the use, for example—can provide the merchant's management with a better tool to improve service or quality. In one or more embodiments, information received by the user can include various data provided with the cooperation of a system or server, such as that of a merchant device (such as that of eBay of San, Jose, Calif.) or payment server (such as, for example, PayPal of San Jose, Calif.). Various data may include, for example, previous ratings of the same serving person, the user's previous ratings of comparable establishments (or of the same establishment), costs at other establishments, and lists of previous purchases by the user. A "Make This Better" feature can prompt the user for input for improvement of the merchant's goods or services, either independently or in conjunction with the various data provided to the user.

In one example, a consumer may have a mobile device executing an application on the device (also widely known as an "app") that establishes a "connection" between the merchant (e.g., a coffee shop) and the consumer customer, in which, as a service providing person (typically referred to as a "server", e.g., a waiter or waitress, in a coffee shop or restaurant; "service providing person" is generally used here to avoid confusion with the computer networking term "server") enters the customer's order, the order is displayed, in line by line detail, on the customer's consumer mobile device in real time, as it is being entered by the server. The app may provide other information, such as the store (in this example, coffee shop) name and location and an identification (ID) for the server. In one embodiment, for example, the customer can provide prompt ratings feedback to the store, based on the information received from the store, about each item ordered (e.g., line item detail), performance of the serving person, or any aspect of the customer's experience at the store, in real time, e.g., as the customer's experience is occurring. The feedback of the promptly given ratings may be delayed so that it is blind, e.g., not visible to the server or the store, at least until the customer has left the store so that customer candidness is not threatened. For example, in a restaurant sending feedback may be delayed so that it is not immediately available to the service providing person, at least until the meal is finished or the customer has left the restaurant, so that the customer can provide ratings promptly without fear of repercussion.

According to an embodiment, a system can comprise one or more memories that are configured to store information, such as information regarding an account of a user, information regarding an account of a merchant, and information regarding relationships between the user account and the merchant account, e.g., lists of previous purchases by the user from the merchant or previous ratings by the user of a particular serving person of the merchant, e.g., a restaurant for this particular example. One or more hardware processors can be in communication with the one or more memories. For example, the one or more hardware processors can be in communication with the one or more memories via a computer bus or communication network.

The one or more hardware processors can be operable to receive communications from the merchant regarding purchase requests of goods or services by the user from the merchant. The one or more hardware processors can be operable to receive communications from the user regarding ratings about the purchases promptly, e.g., as the purchases are being made (e.g., while the user is at the merchant location, during and subsequent to the purchase and up to within a few minutes later) or shortly after purchases are completed (e.g., during a subsequent brief period of a few hours to a day or so). The one or more hardware processors can be operable to provide communications regarding the purchase requests to the user as the purchases are being made, including information accessed from the one or more memories and including various data, such as data regarding relationships between the user account and the merchant account (e.g., previous purchase list of the user, previous ratings given by the user of the merchant or merchant's serving personnel). The one or more hardware processors can be operable to provide communications that send feedback regarding the user's ratings about the purchases to the merchant after occurrence of a pre-determined event or condition. The pre-determined event can be, for example, expiration of a pre-determined period of time from when the user completes the rating, the user indicating (e.g., with a user device in communication with the one or more hardware processors) that it is OK to send the feedback, or the user leaving the merchant or exiting the place of business (e.g., the user leaves the restaurant after rating a serving person but before the rating is sent as part of the feedback to the merchant). Exiting may be determined manually by the user, for example, by entering some information on the user mobile device, or automatically by the mobile device or merchant device, for example, through the use of technology such as relative positions—e.g., using global positioning system (GPS)—of the mobile device and merchant device or determining, for example, that the mobile device is out of WiFi-range of the merchant device.

The user device can be a mobile device, such as smart phones, tablet computers, and the like. The user device can be non-mobile or a substantially stationary device. The one or more memories and the one or more hardware processors can be one or more memories or one or more hardware processors of the user device, the other device (see FIG. 3), a server, or any other device or system.

In an embodiment, the communications provided to the user regarding the purchase request may include an offer of a gift in exchange for a prompt (e.g., while the user is at the merchant, during and subsequent to the purchase and up to within a few minutes later) rating of the merchant. The gift can be customized to the user. For example, at a restaurant, a free desert could be offered in exchange for an prompt rating. The business (e.g., merchant) can be excluded from viewing the rating (e.g., the feedback communication is delayed until occurrence of a pre-determined event or condition) until after the customer leaves the business to better assure fairness.

The one or more hardware processors can be operable to access the information regarding an account of a user, an account of a merchant, and relationships between the user account and the merchant account. So, in the communications to the user from the one or more hardware processors, various data can be provided by, for example, a service provider such as PayPal, Inc., to the user (while the user is providing the prompt ratings, i.e., in real time) such as: a list of what was purchased by the user at a business (e.g., merchant) presently being visited; previous ratings by the user of the same serving person the user is currently being served by; the user's previous ratings of comparable establishments (or of the same—the merchant's—establishment), and costs at other establishments. For grocery shoppers (e.g., the user), for example, the various data can include one or more previous purchase lists that can be useful in present purchase decisions (e.g., the user may ask "did I already purchase something or what else may I need?"). At a restaurant, the various data could include information to remind the user of a well-liked (or a disliked) meal or desert. The various data may include previous data such as pricing, specials, and the like that may be useful in making purchase decisions. For example, if the previous data made available to the user in this way, according to an embodiment, shows that an item is much cheaper on sale, the user can try to get the sale price or can wait for the next sale. Also for example, the one or more hardware processors of a service provider, such as PayPal, Inc., can provide, in the various data, a list of what was purchased by the user (or family and friends) from the business (e.g., merchant) in the past. The list may refresh the user's memory regarding similar experiences that can be included in the prompt rating. For example, the user can say that today's service is consistent (or inconsistent) with past experiences. A "Make This Better" feature can prompt the user for input for improvement of the merchant's goods or services, either independently or in conjunction with the various data provided to the user. For example, the feature prompting the user for improvement input may be triggered by information about the user and the merchant included in the information regarding relationships between the user account and the merchant account. In one embodiment, for example, the merchant may opt to have the feature enabled (e.g., triggered) for all users, triggered only for a group of particular users (e.g., specified or pre-determined users), or users satisfying a particular condition, such as: it is the user's third visit to the merchant, for example.

According to an embodiment, a computer program product can comprise a non-transitory computer readable medium. The non-transitory computer readable medium can have computer readable and executable code for instructing one or more processors to perform any of the methods disclosed herein.

The one or more memories and one or more hardware processors can be part of the same device, e.g., server. The one or more memories and one or more hardware processors can be part of the different devices, e.g., servers. The one or more memories and one or more hardware processors can be co-located. The one or more memories and one or more hardware processors can be located in different places, e.g., different rooms, different buildings, different cities, or different states.

Exemplary applications of apparatuses and methods according to one or more embodiments are described in this section. These examples are being provided solely to add context and aid in the understanding of the embodiments. It will thus be apparent to one skilled in the art that the embodiments may be practiced without some or all of these specific details. In other instances, well known process steps have not been described in detail in order to avoid unnecessarily obscuring the disclosure. Other applications are possible, such that the following examples should not be taken as limiting.

In the following detailed description, references are made to the accompanying drawings, which form a part of the description and in which are shown, by way of illustration, various specific embodiments. Although these embodiments are described in sufficient detail to enable one skilled in the art to practice the embodiments, it is understood that these examples are not limiting, such that other embodiments may be used, and changes may be made without departing from the spirit and scope of the disclosure.

The disclosure relates, in the various described embodiments, to devices, systems and methods involving activities with respect to providing prompt detailed ratings feedback that can be subjected to a controlled delay in sending the actual feedback to merchants and providing information useable in real time from the merchant back to the consumer. In various particular embodiments, the systems or methods can involve one or more user devices in communication over a network. Such a network can facilitate a streamlined process involving providing prompt detailed ratings feedback that can be subjected to a controlled delay in sending the actual feedback to merchants and providing information useable in real time from the merchant back to the consumer.

While the various examples disclosed herein focus on providing prompt detailed ratings feedback that can be subjected to a controlled delay in sending the actual feedback to merchants and providing information useable in real time from the merchant back to the consumer, it will be understood that the various inventive principles and embodiments disclosed herein can be applied to other aspects of electronic commerce, as well.

Systems and Devices

Referring now to FIG. 1, an exemplary embodiment of a computing system adapted for implementing one or more processes involving providing prompt detailed ratings feedback that can be subjected to a controlled delay in sending the actual feedback to merchants and providing information useable in real time from the merchant back to the consumer is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a mobile computing device, a PC, and/or any other computing device having computing and/or communications capabilities in accordance with the described embodiments. Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (G-UTs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated.

In various embodiments, computing system 100 can include, among other elements, a third party 112, which may comprise or employ a third-party server 114 hosting a third-party application 116. In various implementations, third-party server 314 and/or third-party application 116 may host a web site associated with or employed by a third party 112. For example, third-party server 114 and/or third-party application 116 may enable network-based system 110 to provide client 102 with additional services and/or information, such as providing prompt detailed ratings feedback that can be subjected to a controlled delay in sending the actual feedback to merchants and providing information useable in real time from the merchant back to the consumer. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various services including providing prompt detailed ratings feedback that can be subjected to a controlled delay in sending the actual feedback to merchants and providing information useable in real time from the merchant back to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented for providing prompt detailed ratings feedback that can be subjected to a controlled delay in sending the actual feedback to merchants and providing information useable in real time from the merchant back to the consumer, application servers 130 of network-based system 110 may provide various online marketplace and electronic commerce services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and a delivery server 146 structured and arranged to provide prompt detailed ratings feedback that can be subjected to a controlled delay in sending the actual feedback to merchants and to provide information useable in real time from the merchant back to the consumer.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
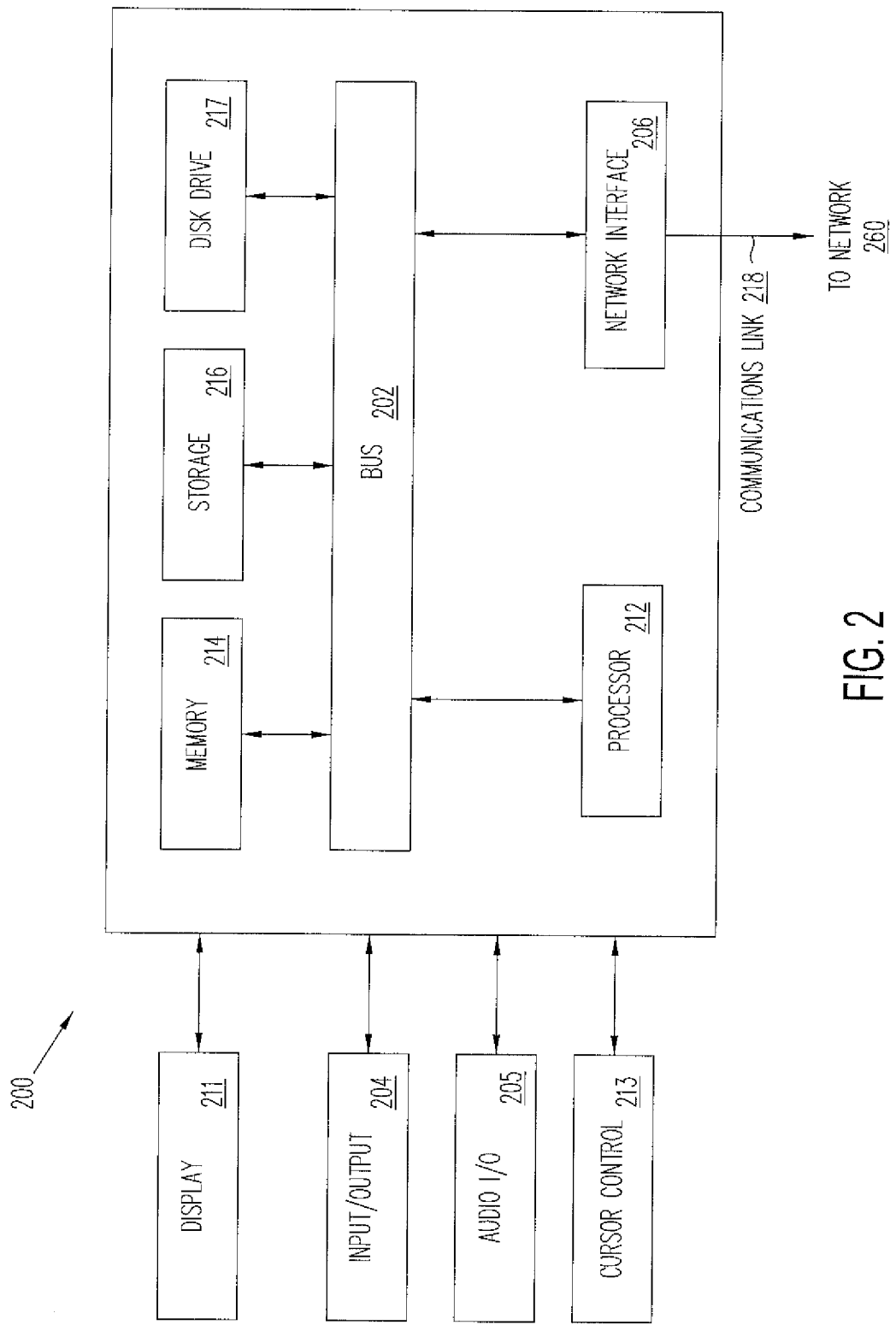
FIG. 2 is a block diagram of an example of a computer system suitable for implementing on one or more devices of the computing system in FIG. 1, according to an embodiment.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart phone, a computing tablet, a personal computer, laptop, PDA, Bluetooth device, key FOB, badge, etc.) that is capable of communicating with a network. The system for providing prompt detailed ratings feedback that can be subjected to a controlled delay in sending the actual feedback to merchants and providing information useable in real time from the merchant back to the consumer may utilize a network computing device (e.g., a network server) capable of communicating with the network. It should be appreciated that each of the devices utilized by users, the system for providing prompt detailed ratings feedback that can be subjected to a controlled delay in sending the actual feedback to merchants and providing information useable in real time from the merchant back to the consumer may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In an embodiment, the transmission is wireless, although other transmission mediums and methods may also be suitable. A processor 212, which can be a micro-controller, digital signal processor (DSP), or other hardware processing component, processes these various signals, such as for display on computer system 200 or transmission to other devices over a network 260 via a communication link 218. Processor 212 may also control transmission of information, such as cookies or IP addresses, to other devices.

Components of computer system 200 also may include a system memory component 214 (e.g., RAM), a static storage component 216 (e.g., ROM), and/or a disk drive 217. Computer system 200 may perform specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In an embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments, execution of instruction sequences for practicing the embodiments may be performed by a computer system. In various other embodiments, a plurality of computer systems coupled by a communication link (e.g., LAN, WLAN, PTSN, or various other wired or wireless networks) may perform instruction sequences to practice the embodiments in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Prompt Ratings Feedback and Information Useable in Real Time by the Customer

As will be readily appreciated, the foregoing networks, systems, devices, and numerous variations thereof can be used to implement systems and methods for providing prompt detailed ratings feedback that can be subjected to a controlled delay in sending the actual feedback to merchants and providing information useable in real time from the merchant back to the consumer. Aspects not requiring user input can be performed substantially autonomously, such as between the user device and the merchant device. Providing prompt detailed ratings feedback that can be subjected to a controlled delay in sending the actual feedback to merchants and providing information useable in real time from the merchant back to the consumer can be performed with the cooperation of a system or server, such as that of a merchant device (such as that of eBay of San, Jose, Calif.) or payment server (such as, for example, PayPal of San Jose, Calif.). The memories and/or processors can thus be memories and/or processors of the user device, another device, and/or the server, for example.

As noted with respect to FIG. 2 above, a computer system 200 can include one or more processors 212 and one or more memories or storage devices 214, 216. Such a computer system 200 can be part of a user device, part of one or more servers on a network-based system, or some combination thereof. In particular, a given computing system can include a first memory device or storage component adapted to store information regarding one or more users of the system, as well as a second memory device or storage component adapted to store information regarding an online merchant.

In addition, one or more processors 212 can be adapted to facilitate providing prompt detailed ratings feedback that can be subjected to a controlled delay in sending the actual feedback to merchants and providing information useable in real time from the merchant back to the consumer. Further functionality of the one or more processors 212 can include facilitating providing prompt detailed ratings feedback that can be subjected to a controlled delay in sending the actual feedback to merchants and providing information useable in real time from the merchant back to the consumer.

Figure 3:
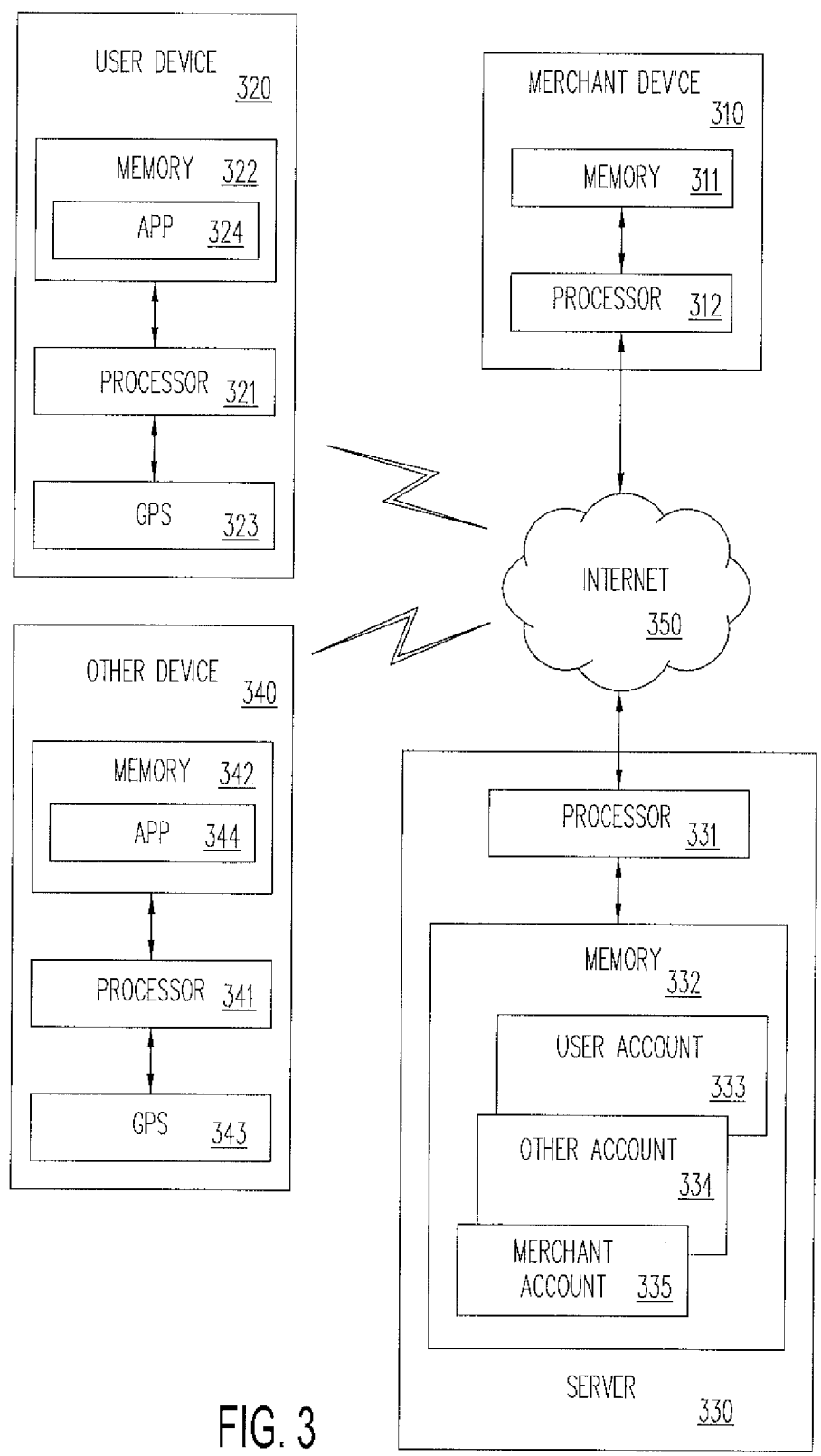
FIG. 3 is a block diagram of a system for providing detailed, prompt consumer ratings with controlled feedback to merchants and also providing information useable in real time back to the consumer, according to an embodiment.

FIG. 3 is a block diagram of a system for providing prompt detailed ratings feedback that can be subjected to a controlled delay in sending the actual feedback to merchants and providing information useable in real time from the merchant back to the consumer, according to an embodiment. The system can include a merchant device 310, a mobile device 320, a payment server 330, or other device 340. The functions and components discussed herein can be split and shared among the merchant device 310, the mobile device 320, the payment server 330, and any other devices 340 or systems, as desired.

The merchant device 310 can comprise a merchant checkout terminal, a computer, or server, for example. The merchant device 310 can be a merchant device of any retailer, or provider of services such as dining or car maintenance, for example. The merchant device 310 can include a memory 311 and a processor 312. The merchant device 310 can be used for processing purchases from the merchant.

The merchant device 310 can be used, for example, for receiving prompt detailed ratings feedback that can be subjected to a controlled delay in sending the actual feedback to the merchant and for providing information useable in real time from the merchant back to the consumer.

The mobile device 320 can be carried by the user. The mobile device 320 can comprise a cellular telephone, a smart telephone, a hand held computer, a laptop computer, a notebook computer, or a tablet computer, for example. The mobile device 320 can include a processor 321, a memory 322, and a global positioning system (GPS) 323.

The mobile device 320 can be used for routine telephone calls, text messaging, web browsing, and the like. The mobile device 320 can be used, for example, for providing prompt detailed ratings feedback that can be subjected to a controlled delay in sending the actual feedback to merchants and receiving information useable in real time from the merchant back to the consumer.

An app 324 can be stored in the memory 322 and executed by the processor 321. The app 324 can be used, as described above, for receiving information useable in real time from the merchant back to the consumer and for providing prompt detailed ratings feedback that can be subjected to a controlled delay in sending the actual feedback to merchants.

The other device 340 can be different from, identical to, or similar to the user device 320. The other device 340 can be carried by the user. The other device 340 can comprise a cellular telephone, a smart telephone, a hand held computer, a laptop computer, a notebook computer, or a tablet computer, for example. The other device 340 can include a processor 341, a memory 342, and a global positioning system (GPS) 343. The other device 340 can be used for routine telephone calls, text messaging, web browsing, and the like. An app 344 can be stored in the memory 342 and executed by the processor 341. The app 344 can be used for facilitating prompt detailed ratings feedback to the merchant that can be subjected to a controlled delay in sending the actual feedback to the merchant and providing information useable in real time from the merchant back to the consumer.

The server 330 can comprise a server of a payment provider, such as PayPal, Inc. Thus, the server 330 can be a payment server. The server 330 can be a single server or can be a plurality of servers. The server 330 can include one or more processors 331 and one or more memories 332. The memory 332 can be a memory of the server 330 or a memory that is associated with the server 330. The memory 332 can be a distributed memory. The memory 332 can include storage for a user account 333, other account 334, and a merchant account 335 and for relationships between and among the user account 333, the other account 334, and the merchant account 335. Storage for such relationships between and among the user account 333, the other account 334, or the merchant account 335 can include routine purchase information, such as credit or purchase limits, purchase histories, lists of previous purchases by the user at the merchant, previous ratings by the user of a previously encountered service providing person of the merchant, information about specials provided by the merchant that the user may be interested in, and the like as described above.

The server 330 can be used for any combination of relaying, filtering, and delaying communications between merchant device 310, user device 320, other device 340, and server 330 that may facilitate providing prompt detailed ratings feedback to the merchant that can be subjected to a controlled delay in sending the actual feedback to the merchant and providing information useable in real time from the merchant back to the consumer Generally, the merchant device 310, the mobile device 320, and the payment server 330 can perform functions discussed herein. That is, at least to some extent, a function that is discussed herein as being performed via a particular one of these devices can be performed by a different one of these devices, by a combination of these devices, and/or by other devices The merchant device 310, the mobile device 320, the other mobile devices 330, and the server 330 can communicate with one another via a network, such as the Internet 350. The merchant device 310, the mobile device 320, the other mobile devices 340, and the server 330 can communicate with one another via one or more networks, such as local area networks (LANs), wide area networks (WANs), cellular telephone networks, and the like. The merchant device 310, the mobile device 320, the other mobile devices 340, and the server 330 can communicate with one another, at least partially, via one or more near field communications (NFC) methods or other short range communications methods, such as infrared (IR), Bluetooth, WiFi, and WiMax.

Methods

Figure 4:
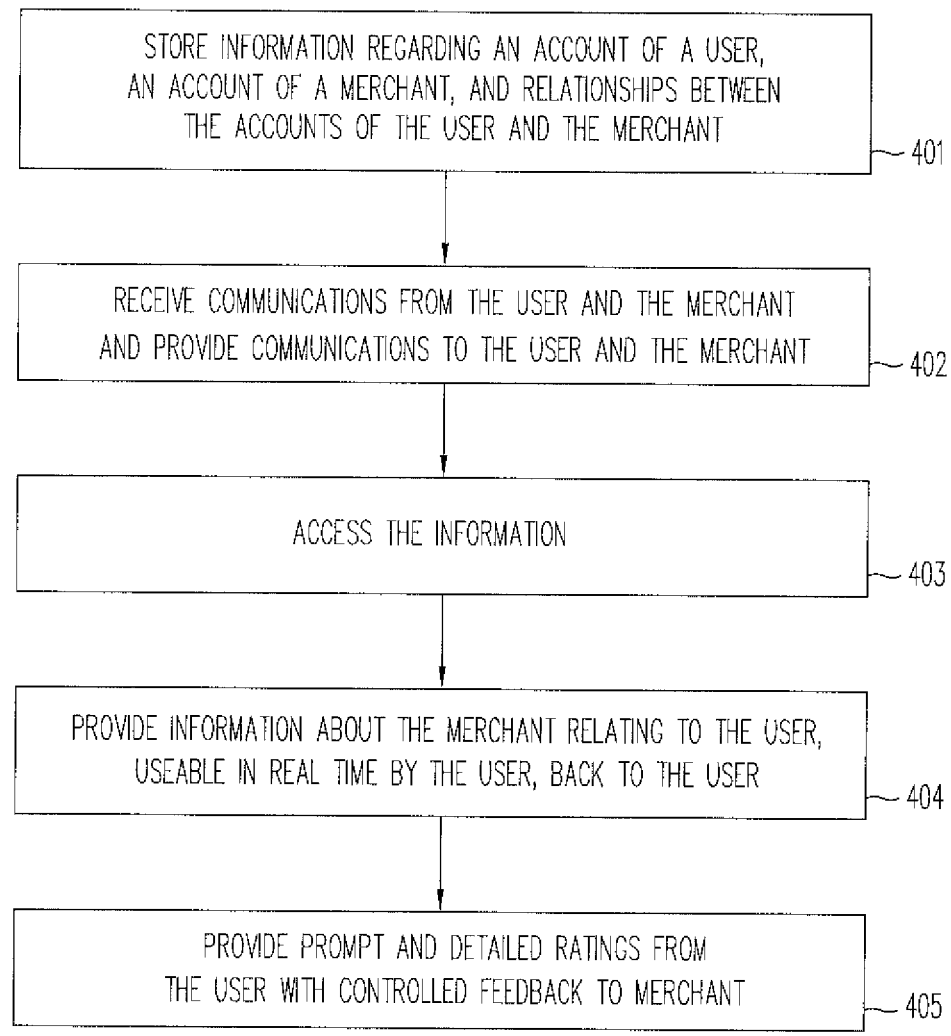
FIG. 4 is a flow chart of a method for providing detailed, prompt consumer ratings with controlled feedback to merchants and also providing information useable in real time back to the consumer, according to an embodiment.

FIG. 4 is a flow chart that describes an example of operation of the system for providing detailed feedback promptly or with a controlled delay to merchants and providing information useable in real time back to the consumer according to embodiments thereof. Note that one or more of the steps described herein may be combined, omitted, or performed in a different order, as desired or appropriate.

Information (e.g., information regarding a user account 333, a merchant account 335, and relationships between the user account 333 and the merchant account 335) can be stored in one or more memories, such as a memory 332 of a server 330, as shown in step 401.

Communications may be received (e.g., by a server 330), as shown in step 402, from a user and a merchant (e.g., from user device 320 and merchant device 310, respectively) and may also be provided back to the user and the merchant from the server 330 so that the server can relay, filter, or delay communications between merchant device 310 and user device 320. For example, server 330 may provide the user's lists of previous purchases or ratings to the user device 320 without burdening the merchant device 310 and the server 330 may receive the prompt ratings from the user device 320 and subject the prompt ratings feedback to a conditional delay (e.g., waiting for the user to leave a restaurant) before sending the actual feedback on to the merchant device 310.

The information can be accessed, as shown in step 403. For example, the account information stored in the one or more memories 322 of the user device 320 or stored in the one or more memories 332 of the server 330 can be accessed. Accessing the account information for the user and merchant can help the server 330 determine, for example, what information should be provided to the user, what the condition should be for delaying feedback or whether any condition for delay should apply, or whether a gift should be offered for providing prompt feedback as well as how the gift may be customized for the user.

Information about the merchant relating to the user can be provided back to the user, as shown in step 404, so that the information is useable in real time. For example, information about specials or reduced prices can be provided before the user actually makes a purchase. Also for example, the user's previous ratings about a service providing person or some other reminder of previous experience with a particular merchant can be provided to the user before the prompt rating is given and feedback sent to the merchant.

The prompt and detailed ratings can be provided from the user, as shown in step 405, back to the merchant with controlled (e.g., either subject or not subject to delay) feedback to the merchant. Ratings can be provided by the user promptly, e.g., as the user is making purchases, or as the user is shopping, dining, or receiving services, via the use of mobile or user device 320, for example. The prompt and detailed ratings can be given concurrently with the receipt of information relevant to the ratings, such as the user's previous purchases from the merchant, previous ratings regarding the merchant, and line item detail of purchases and services currently being received from the merchant, which can also be received by the user via mobile or user device 320, for example. Such information relevant to the ratings can be received (on user device 320 via network 350) either directly from the merchant (e.g., from merchant device 310 via network 350) or via network 350 from the server 330, which can be operated by a service provider such as PayPal, Inc., for example. The detailed, promptly given ratings can be provided as feedback to the merchant either concurrently or with a controlled delay (e.g., waiting for customer OK or other conditional event) as described above. The delay may be controlled, for example, either automatically from the user device 320 or from the server 330—by having the feedback pass by way of server 330 (via network 350) before being provided to merchant device 310 (via network 350).

The one or more memories and the one or more processors can be one or more memories or one or more processors of the merchant device 310, the user device 320, the server 330, the other device 340, and/or any other device or system. Memories and/or processors from any number of devices, systems, and entities can cooperate to perform the method disclosed herein of providing prompt, detailed feedback with controlled delay to merchants and providing information useable in real time back to the consumer.

In implementation, at least some of the various embodiments may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In an embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the embodiments.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

As used herein, the term "store" can include any business or place of business. The store can be a brick and mortar store or an online store. Providing detailed feedback concurrently or with a controlled delay to merchants and providing information useable in real time back to the consumer can be used for either brick-and-mortar store purchases or online purchases. Examples of stores can include supermarkets, discount stores, book stores, convenience stores, restaurants, gas stations, auto repair shops, and movie theaters. The store can be any person or entity that sells a product or provides a service.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut. Products can be purchased from brick-and-mortar stores or from online stores.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "card" can refer to any card or other device that can be used to make a purchase in place of cash. For example, the card can be a bank card, credit card, debit card, gift card, or other device. The card can be a token, such as a hardware token or a software token. The card can be stored in and/or displayed upon a user device, such as a cellular telephone.

The foregoing disclosure is not intended to limit the disclosure to the precise forms or particular fields of use disclosed. It is contemplated that various alternate embodiments and/or modifications, whether explicitly described or implied herein, are possible in light of the disclosure. Having thus described various example embodiments of the disclosure, persons of ordinary skill in the art will recognize that changes may be made in form and detail without departing from the scope of the disclosure. Thus, the disclosure is limited only by the claims.

What is claimed is:

1. A system comprising:
   a non-transitory memory storing information regarding an account of a user, an account of a merchant, and relationships between the user account and the merchant account; and
   one or more hardware processors configured to execute instructions to cause the system to perform operations comprising:
   obtaining communications from the merchant regarding a purchase request associated with a transaction at a merchant location by the user;
   based on the communications, determining that the user is at the merchant location;
   in response to the determining, providing a data request to a mobile user device associated with the user requesting the user to provide a data set including a user feedback to the transaction
   obtaining the data set from the mobile user device;
   obtaining first location data associated with the mobile user device;
   (A) determining, based on the first location data, that the user is within a predefined proximity to the merchant location;

in response to the determining (A), preventing access to the data set by the merchant by delaying transmission of the data set to a device associated with the merchant and without implementing one or more data access control techniques on the device associated with the merchant;
obtaining second location data associated with the mobile user device;
(B) determining, based on the second location data, that the user is not within the predefined proximity to the merchant location; and
in response to the determining (B), granting access to the data set by the merchant by transmitting the data set to the device associated with the merchant.

2. The system of claim 1, wherein (B) determining, based on the second location data, that the user is not within the predefined proximity to the merchant location comprises determining that the user is exiting a place of business associated with the merchant.

3. The system of claim 1, wherein (B) determining that the user is not within the predefined proximity to the merchant location comprises detecting a predefined user input on the mobile user device.

4. The system of claim 1, wherein (B) determining that the user is not within the predefined proximity to the merchant location comprises determining that a pre-determined period of time has passed after obtaining the data set from the mobile user device.

5. The system of claim 1, wherein the operations further comprise:
based on the communications, presenting on the mobile user device an offer of a gift in exchange for the user providing the data set with a predefined time period.

6. The system of claim 1, wherein obtaining the second location data comprises obtaining an indication, from the merchant, that the mobile user device is not connected to a Wi-Fi service available at the merchant location.

7. The system of claim 1, wherein obtaining the second location data comprises obtaining an indication, from the mobile user device, that the mobile user device is not connected to a Wi-Fi service available at the merchant location.

8. The system of claim 1, wherein obtaining the second location data comprises obtaining GPS data, from the mobile user device, that is descriptive of a current location of the mobile user device.

9. The system of claim 1, wherein the operations further comprise: preventing the data set from being transmitted from the mobile user device to the device associated with the merchant directly without the system.

10. The system of claim 1, wherein the purchase request includes a request to make at least a portion of a payment for the transaction.

11. A method comprising:
obtaining communications from a merchant regarding a purchase request associated with a transaction at a merchant location by the user;
based on the communications, determining that the user is at the merchant location;
in response to the determining, providing a data request to a mobile user device associated with the user requesting the user to provide a data set including a user feedback to the transaction;
obtaining the data set from the mobile user device;
obtaining first location data associated with the mobile user device;

(A) determining, based on the first location data, that the user is within a predefined proximity to the merchant location;
in response to the determining (A), preventing access to the data set by the merchant by delaying transmission of the data set to a device associated with the merchant and without implementing one or more data access control techniques on the device associated with the merchant;
obtaining second location data associated with the mobile user device;
(B) determining, based on the second location data, that the user is not within a predefined proximity to the merchant location; and
in response to the determining (B), granting access to the data set by the merchant by
transmitting the data set to the device associated with the merchant.

12. The method of claim 11, wherein
(B) determining, based on the second location data, that the user is not within the predefined proximity to the merchant location comprises determining that the user is exiting a place of business associated with the merchant.

13. The method of claim 11, wherein (B) determining that the user is not within the predefined proximity to the merchant location comprises detecting a predefined user input on the mobile user device.

14. The method of claim 11, wherein (B) determining that the user is not within a predefined proximity to the merchant location comprises determining that a pre-determined period of time has passed after obtaining the data set from the mobile user device before sending the feedback.

15. The method of claim 11, further comprising based on the communications, presenting on the mobile user device an offer of a gift in exchange for the user providing the data set with a predefined time period a prompt feedback for the merchant.

16. The method of claim 11, wherein obtaining the second location data comprises obtaining an indication, from the merchant, that the mobile user device is not connect to a Wi-Fi service available at the merchant location.

17. The method of claim 11, wherein obtaining the second location data comprises obtaining GPS data, from the mobile user device, that is descriptive of a current location of the mobile user device.

18. The method of claim 11, further comprising preventing the data set from being transmitted from the mobile user device to the device associated with the merchant directly without the system.

19. The method of claim 11, wherein the purchase request includes a request to make at least a portion of a payment for the transaction.

20. A machine-readable medium having stored thereon machine-readable instructions executable to cause a machine to perform operations comprising:
obtaining communications from a merchant regarding a purchase request associated with a transaction at a merchant location by a user;
based on the communications, determining that the user is at the merchant location;
in response to the determining, providing a data request to a mobile user device associated with the user requesting the user to provide a data set including a user feedback to the transaction;
obtaining the data set from the mobile user device;

obtaining first location data associated with the mobile user device;
(A) determining, based on the first location data, that the user is within a predefined proximity to the merchant location;
in response to the determining (A), preventing access to the data set by the merchant by delaying transmission of the data set to a device associated with the merchant and without implementing one or more data access control techniques on the device associated with the merchant;
obtaining second location data associated with the mobile user device;
(B) determining, based on the second location data, that the user is not within a predefined proximity to the merchant location; and
in response to the determining (B), granting access to the data set by the merchant by transmitting the data set to the device associated with the merchant.

* * * * *